(12) United States Patent
Jeon et al.

(10) Patent No.: US 9,915,835 B2
(45) Date of Patent: Mar. 13, 2018

(54) FPR HAVING PERIODIC MICROPATTERN

(71) Applicant: LG CHEM, LTD., Seoul (KR)

(72) Inventors: Byoung Kun Jeon, Daejeon (KR); Moon Soo Park, Daejeon (KR); Bu Gon Shin, Daejeon (KR); Sin Young Kim, Daejeon (KR); Jong Byung Lee, Daejeon (KR); Da Mi Lee, Daejeon (KR); Ji Hoon Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/575,468

(22) Filed: Dec. 18, 2014

(65) Prior Publication Data

US 2015/0103279 A1  Apr. 16, 2015

Related U.S. Application Data

(63) Continuation of application No. PCT/KR2013/011045, filed on Nov. 29, 2013.

(30) Foreign Application Priority Data

Nov. 29, 2012 (KR) .................. 10-2012-0137417
Nov. 29, 2013 (KR) .................. 10-2013-0147841

(51) Int. Cl.
*G02F 1/1335* (2006.01)
*G02B 27/22* (2018.01)
*G02F 1/1337* (2006.01)
*G02B 27/28* (2006.01)

(52) U.S. Cl.
CPC ... *G02F 1/133504* (2013.01); *G02B 27/2214* (2013.01); *G02F 1/133512* (2013.01); *G02F 1/133553* (2013.01); *G02F 1/133711* (2013.01); *G02F 1/133753* (2013.01); *G02B 27/28* (2013.01); *Y10T 428/2457* (2015.01); *Y10T 428/24479* (2015.01)

(58) Field of Classification Search
CPC ... G02F 1/133711; G02F 2001/133776; G02F 1/13378; G02F 2001/133792; G02F 1/133504; G02F 1/133512; G02F 1/133553; G02B 27/2214; G02B 27/28; Y10T 428/24479; Y10T 428/2457

See application file for complete search history.

(56) References Cited

U.S. PATENT DOCUMENTS

2005/0237471 A1* 10/2005 Kawamura ........... B29C 59/046
349/158
2009/0009703 A1* 1/2009 Tamaki ............. G02F 1/133788
349/123

(Continued)

FOREIGN PATENT DOCUMENTS

CN     102279484 A   12/2011
EP        2239602 A1   3/2010
(Continued)

*Primary Examiner* — Nathanael R Briggs
(74) *Attorney, Agent, or Firm* — Dentons US LLP

(57) ABSTRACT

This application relates a liquid crystal alignment film, a manufacturing method of the liquid crystal alignment film, an optical filter, and a display device. According to one illustrative liquid crystal alignment film, for example, a stereoscopic image can be displayed in wide viewing angles without losses of the brightness.

14 Claims, 11 Drawing Sheets

(56) References Cited

U.S. PATENT DOCUMENTS

| | | | |
|---|---|---|---|
| 2009/0122242 A1* | 5/2009 | Nakamura | G02F 1/133512 349/110 |
| 2010/0110323 A1* | 5/2010 | Shao | G02F 1/133707 349/46 |
| 2010/0253894 A1* | 10/2010 | Yoon | G02F 1/13394 349/123 |
| 2011/0292329 A1 | 12/2011 | Huang et al. | |
| 2011/0292330 A1* | 12/2011 | Huang | G02B 5/3083 349/117 |
| 2011/0298792 A1 | 12/2011 | Lim | |
| 2012/0076954 A1* | 3/2012 | Yoo | C07C 69/734 428/1.2 |
| 2012/0169979 A1 | 7/2012 | Cheng et al. | |
| 2012/0212696 A1 | 8/2012 | Trajkovska et al. | |
| 2012/0262449 A1 | 10/2012 | Jeon et al. | |
| 2012/0287504 A1* | 11/2012 | Jang | G02B 27/26 359/463 |
| 2013/0265289 A1* | 10/2013 | Chen | G02F 1/1337 345/211 |

FOREIGN PATENT DOCUMENTS

| | | |
|---|---|---|
| JP | 09-167376 A | 6/1997 |
| JP | 2004-109258 A | 4/2004 |
| JP | 2005049865 | 2/2005 |
| JP | 2005-266116 A | 9/2005 |
| JP | 2007-249027 A | 9/2007 |
| JP | 2010-55043 A | 3/2010 |
| JP | 2011-058827 A | 8/2011 |
| JP | 2012-168375 A | 9/2012 |
| KR | 1020060053238 | 5/2006 |
| KR | 1020100089782 | 8/2010 |
| KR | 100967899 | 9/2010 |
| KR | 1020110021374 | 3/2011 |
| TW | 201227096 A1 | 7/2012 |

* cited by examiner

FIG. 10

| LS |
|----|
| RS |
| LS |
| RS |
| LS |
| RS |

FIG. 11

| LS | RS | LS | RS | LS | RS | LS |
|----|----|----|----|----|----|----|
| RS | LS | RS | LS | RS | LS | RS |
| LS | RS | LS | RS | LS | RS | LS |
| RS | LS | RS | LS | RS | LS | RS |
| LS | RS | LS | RS | LS | RS | LS |
| RS | LS | RS | LS | RS | LS | RS |
| LS | RS | LS | RS | LS | RS | LS |
| RS | LS | RS | LS | RS | LS | RS |

FIG. 14

| LG |
| RG |
| LG |
| RG |
| LG |
| RG |

FIG. 15

| LG | RG | LG | RG | LG | RG | LG |
|----|----|----|----|----|----|----|
| RG | LG | RG | LG | RG | LG | RG |
| LG | RG | LG | RG | LG | RG | LG |
| RG | LG | RG | LG | RG | LG | RG |
| LG | RG | LG | RG | LG | RG | LG |
| RG | LG | RG | LG | RG | LG | RG |
| LG | RG | LG | RG | LG | RG | LG |
| RG | LG | RG | LG | RG | LG | RG |

(a) Comparative example 1            (b) Example 1

FPR HAVING PERIODIC MICROPATTERN

CROSS-REFERENCE TO RELATED APPLICATION

This application is a Continuation Bypass of International Application No. PCT/KR2013/011045, filed Nov. 29, 2013, and claims the benefit of Korean Application Nos. 10-2012-0137417, and 10-2013-0147841, filed on Nov. 29, 2012, and Nov. 29, 2013, respectively, all of which are hereby incorporated by reference in their entirety for all purposes as if fully set forth herein.

TECHNICAL FIELD

The present application relates to a liquid crystal alignment film, a manufacturing method of the liquid crystal alignment film, an optical filter, and a display device.

BACKGROUND

A stereoscopic image display device is a display device capable of transmitting three-dimensional information to an observer.

Methods for displaying stereoscopic images may include, for example, methods that use glasses and methods that don't use glasses. Also, the methods using glasses may be classified into methods using polarizing glasses and methods using LC shutter glasses, and the methods that don't use glasses may be classified into stereoscopic/multi-view point binocular disparity methods, volumetric methods, holographic methods, and the like. Patent Document 1 (Japanese Patent Publication No. 2005-049865), Patent Document 2 (Korean Patent No. 0967899) and Patent Document 3 (Korean Patent Publication No. 2010-0089782) describe optical elements which can be efficiently used in a stereoscopic image display process.

DETAILED DESCRIPTION

Technical Object

This application provides a liquid crystal alignment film, a manufacturing method of the liquid crystal alignment film, an optical filter, and a display device.

Technical Solution

This application relates to a liquid crystal alignment film. A liquid crystal alignment film according to one embodiment may include a surface having a liquid crystal alignment ability and a groove. In the present specification, the term "surface having a liquid crystal alignment ability" means a surface having an ability to induce alignment of a liquid crystal layer adjacent to the surface. In one embodiment, the groove may be present directly in the surface having a liquid crystal alignment ability, or may be present at a certain region of an upper part or a lower part of the surface. According to one embodiment, the groove may have a width in the range of, for example, 5 μm to 300 μm and a depth in the range of, for example, 0.5 μm to 5 μm.

FIGS. 1 to 3 show schematics of illustrative embodiments of the liquid crystal alignment films 1. In one embodiment, the liquid crystal alignment film 1 may have a structure in which a groove 102 is present directly in a surface having a liquid crystal alignment ability 101 as illustrated in FIG. 1. In another embodiment, the liquid crystal alignment film 1 may have a structure in which a liquid crystal alignment layer 104 is formed on a surface of an underlying layer 103 including the groove 102 as illustrated in FIG. 2. In this case, the liquid crystal alignment film may further include a substrate layer 105 formed on the side of the underlying layer 103, where the liquid crystal alignment layer 104 is not formed. In another embodiment, the liquid crystal alignment film 1 may further include a substrate layer 105 as illustrated in FIG. 3, and in this case, the liquid crystal alignment film 1 may have a structure in which the liquid crystal alignment layer 104 is formed directly on a surface of the substrate layer 105 including the groove 102.

The surface having a liquid crystal alignment ability can be formed by a typical alignment layer publicly known in the art. As the alignment layer, conventional alignment layers known in the field may be used. For example, a photo-alignment layer, of which an alignment may be determined by dimerization, fries rearrangement or cis-trans isomerization reaction induced by an irradiation with a linearly polarized light, and which then can induce an alignment in a liquid crystal layer adjacent thereto by the determined alignment, a polymer layer such as a rubbed polyimide layer or an alignment layer in which a plurality of patterned grooves are formed such as an alignment layer formed by an imprinting method such as a nano imprinting method may be exemplified.

In one embodiment, the alignment layer may be a photo-alignment layer. The photo-alignment layer may be formed by using, for example, a photo-alignment compound. The photo-alignment compound refers to a compound capable of inducing alignment of an adjacent liquid crystal compound through alignment in a certain direction by irradiation of light, for example, irradiation of linearly polarized light.

The photo-alignment compound may contain, for example, a photosensitive moiety. There have been publicly known various photo-alignment compounds which can be used for alignment of a liquid crystal compound. As the photo-alignment compound, for example, a compound aligned by trans-cis photoisomerization, a compound aligned by photo-destruction such as chain scission or photo-oxidation, a compound aligned by photo-crosslinking such as [2+2] cycloaddition, [4+4] cycloaddition, or photodimerization, or photopolymerization, a compound aligned by photo-Fries rearrangement, a compound aligned by ring opening/closure, or the like may be used. The compound aligned by trans-cis photoisomerization may include, for example, an azo compounds such as a sulfonated diazo dye or an azo polymer, or stilbene compounds. The compound aligned by photo-destruction may include, for example, cyclobutane-1,2,3,4-tetracarboxylic dianhydride, aromatic polysilane or polyester, polystyrene, polyimide, or the like. Further, the compound aligned by photo-crosslinking or photopolymerization may include, for example, a cinnamate compound, a coumarin compound, a cinnamamide compound, a tetrahydrophthalimide compound, a maleimide compound, a benzophenone compound, or a diphenylacetylene compound, a compound including a chalconyl moiety (hereinafter, referred to as "chalcone compound") or a compound including an anthracenyl moiety (hereinafter, referred to as "anthracenyl compound") as a photosensitive moiety. The compound aligned by photo-Fries rearrangement may include aromatic compounds such as a benzoate compound, a benzoamide compound, methacrylamidoaryl methacrylate, and the like. The compound aligned by ring opening/closure may include, for example, a compound aligned by ring opening/closure in a ring opening/closure reaction of a [4+2] π-electronic system such as a spiropyran compound, but it is not limited thereto.

The photo-alignment compound may be, for example, a monomolecular compound, a monomeric compound, an oligomeric compound, or a polymeric compound, or a blend of the photo-alignment compound and a polymer. The oligomeric or polymeric compound may have a moiety induced from the above-described photo-alignment compound or the above-described photosensitive moiety in a main chain or at a side chain.

Examples of the polymer which may have a moiety induced from a photo-alignment compound or a photosensitive moiety or may be blended with the photo-alignment compound may include polynorbonene, polyolefin, polyarylate, polyacrylate, poly(meth)acrylate, polyimide, poly(amic acid), polymaleinimide, polyacrylamide, polymethacrylamide, polyvinyl ether, polyvinyl ester, polystyrene, polysiloxane, polyacrylnitrile, or polymethacrylnitrile, but it is not limited thereto.

Representative examples of the polymer which may be contained in the photo-alignment compound may include polynorbonene cinnamate, polynorbonene alkoxy cinnamate, polynorbonene allyloyloxy cinnamate, polynorbonene fluorinated cinnamate, polynorbornene chlorinated cinnamate, or polynorbornene dicinnamate, but it is not limited thereto.

If the photo-alignment compound is the polymeric compound, the compound may have a number average molecular weight in the range of, for example, from about 10,000 g/mol to about 500,000 g/mol, but it is not limited thereto.

A method of forming a photo-alignment layer using the above-described photo-alignment compound is not particularly limited and may employ a method publicly known in the art.

In one embodiment, the liquid crystal alignment film may further include a substrate layer and a surface having a liquid crystal alignment ability may be formed on the substrate layer. FIGS. 2 and 3 show schematics of illustrative embodiments of the liquid crystal alignment films including a substrate layer. As described above, the liquid crystal alignment film may have a structure in which the underlying layer 103 including the groove 102 and the liquid crystal alignment layer 104 are formed in sequence on the substrate layer 105 as illustrated in FIG. 2, or may have a structure in which the groove 102 is formed directly in the substrate layer 105 and the liquid crystal alignment layer 104 is formed thereon as illustrated in FIG. 3.

As the substrate layer, for example, a glass substrate or a plastic substrate typically used in manufacturing optical elements may be used. Examples of the plastic substrate layer may include a cellulose substrate including triacetyl cellulose (TAC) or diacetyl cellulose (DAC); a cyclo olefin polymer (COP) substrate such as a norbornene derivative; an acryl substrate such as poly(methyl methacrylate) (PMMA); a polycarbonate (PC) substrate; a polyolefin substrate such as polyethylene (PE) or polypropylene (PP); a polyvinyl alcohol (PVA) substrate; a polyethersulfone (PES) substrate; a polyetheretherketone (PEEK) substrate; a polyetherimide (PEI) substrate; a polyethylene naphthalate (PEN) substrate; a polyester substrate such as polyethylene terephthalate (PET); a polyimide (PI) substrate; a polysulfone (PSF) substrate; or a fluororesin substrate such as an amorphous fluororesin, but is not limited thereto. According to an exemplary embodiment, a cellulose substrate such as a TAC substrate may be used.

The plastic substrate layer may have a refractive index lower than that of a liquid crystal layer to be described below. A refractive index of an exemplary substrate layer may be in the range of about 1.33 to about 1.53. If the substrate layer has a refractive index lower than that of the liquid crystal layer, it is useful in improving brightness, preventing reflection, and improving a contrast characteristic. Further, for example, the plastic substrate layer may be optically isotropic or anisotropic.

In one embodiment, the substrate layer may further contain a UV blocking agent or a UV ray absorbent. If a UV blocking agent or a UV ray absorbent is contained in the substrate layer, deterioration of the liquid crystal layer caused by UV rays can be prevented. Examples of the UV blocking agent or the UV ray absorbent may include an organic material such as a salicylic acid ester compound, a benzophenone compound, an oxybenzophenone compound, a benzotriazol compound, a cyanoacrylate compound, or a benzoate compound, or an inorganic material such as zinc oxide or nickel complex salt. A content of the UV blocking agent or the UV ray absorbent in the substrate layer is not particularly limited and may be selected appropriately for purpose of the effect. For example, in manufacturing the plastic substrate layer, the UV blocking agent or the UV ray absorbent may be contained in an amount of about 0.1 wt % to about 25 wt % with respect to the weight of a main material of the substrate layer.

The substrate layer may have, for example, a monolayer structure or a multilayer structure and a monolayer structure may be selected for providing an element having a smaller thickness. A thickness of the substrate layer is not particularly limited and may be adjusted appropriately for purpose of use.

In one embodiment, the groove included in the liquid crystal alignment film may have, for example, a width (W) and a depth (D) as illustrated in FIG. 2. For example, the groove included in the liquid crystal alignment film may have a width in the range of 5 μm to 300 μm, from 50 μm to 250 μm, or from 100 μm to 200 μm, and a depth in the range of 0.5 μm to 5 μm, from 1 μm to 4.5 μm, from 1.5 μm to 4.0 μm, from 2.0 μm to 3.5 μm, or from 2.5 μm to 3.0 m. If the width and the depth of the groove of the liquid crystal alignment film satisfy the above-described ranges, when the liquid crystal alignment film is included in an optical filter, which will be described below, to be used in a display device, brightness of the display device can be improved.

In one embodiment, the liquid crystal alignment film may include two or more grooves, and the grooves may have stripe shapes extending in the same direction respectively, and may be separately arranged from each other. In another embodiment, the grooves may be separately arranged from each other in a lattice pattern. However, arrangement of the grooves is not limited thereto and may employ other various designs.

In one embodiment, the grooves included in the liquid crystal alignment film may have, for example, a pitch P between the grooves separately arranged from each other as illustrated in FIG. 2. The grooves included in the liquid crystal alignment film may have a pitch P between the grooves separately arranged from each other in the range of, for example, from 50 μm to 1000 μm. If the pitch between the grooves of the liquid crystal alignment film satisfies the above-described range, when the liquid crystal alignment film is included in an optical filter, which will be described below, to be used in a display device, brightness of the display device can be improved.

In one embodiment, the grooves of the liquid crystal alignment film may be filled with a light blocking material, a light reflecting material, or a light scattering material. For example, the grooves of the liquid crystal alignment film may contain one or more of the above-described materials in a mixed state or in a state where the materials form layers distinguishable from each other.

FIGS. 4 to 6 show schematics of illustrative embodiments of the liquid crystal alignment films comprising the liquid crystal alignment layer 104 present on the surface of the underlying layer 103 including the grooves, wherein the grooves are filled with the above-described materials. FIG. 4 shows one embodiment where the grooves of the liquid crystal alignment film are filled with a light blocking material 106, FIG. 5 shows one embodiment where the grooves of the liquid crystal alignment film are filled with the light blocking material 106 and another functional material such as a light reflecting material 107, and FIG. 6 shows one embodiment where the grooves of the liquid crystal alignment film are filled with the light reflecting material 107.

The light blocking material, the light reflecting material, or the light scattering material are not particularly limited in kind and may employ publicly-known materials. For example, the light blocking material may employ publicly-known light blocking or light absorbing ink without particular limitation. Examples of the ink may include carbon black ink or ink including inorganic pigment such as graphite or iron oxide, or organic pigment ink (black pigment ink) such as an azo-based pigment or a phthalocyanine-based pigment. For example, the light reflecting material may employ metallic ink, a cholesteric liquid crystal material, a birefractive material, or the like. For example, the light scattering material may employ silica particles or nanoparticles. Each of the light blocking material, the light reflecting material, and the light scattering material may be used alone or may be mixed with an appropriate binder and/or a solvent so as to fill the grooves. For example, if the liquid crystal alignment film is applied to an optical filter to be described below, light transmittance of the groove regions can be adjusted by adjusting a mixing amount or a kind of the pigment.

In one embodiment, the liquid crystal alignment film may include a first layer having a surface in which a groove has a width in the range of 5 μm to 300 μm and a depth in the range of 0.5 μm to 5 μm; and a liquid crystal alignment layer formed on the surface of the first layer. For example, the first layer may include the underlying layer 103 and the substrate layer 105 as illustrated in FIG. 2, or may include the substrate layer 105 only as illustrated in FIG. 3.

The substrate layer of the first layer may employ the same glass or plastic substrate layer described above with respect to the substrate layer, and the underlying layer of the first layer may employ, for example, any one selected from publicly-known resin layers without particular limitation. The resin layer may contain, for example, a room temperature-curable resin composition, a moisture-curable resin composition, a thermosetting resin composition, or an active energy ray-curable resin composition in a cured state. According to an exemplary embodiment, the resin layer may contain a thermosetting resin composition or an active energy ray-curable resin composition, or may contain an active energy ray-curable resin composition in a cured state. In explanation of a high hardness layer, the term "cured state" means a state where elements contained in each of the resin compositions go through a crosslinking reaction or a polymerization reaction, and thus, the resin composition is converted into a hardened state. Further, the room temperature-curable resin composition, the moisture-curable resin composition, the thermosetting resin composition, or the active energy ray-curable resin composition means a composition which can be induced to be in the cured state at room temperature, in the presence of adequate moisture, by application of heat, or by irradiation of active energy rays.

For example, a surface of the first layer may have a maximum height roughness of 1 μm or less, 0.8 μm or less, 0.6 μm or less, 0.4 μm or less, or 0.2 μm or less in state that the grooves are filled with the light blocking material, the light reflecting material, or the light scattering material. The maximum height roughness means a distance between a straight line passing through an uppermost point of an illumination curve and a straight line passing through a lowermost point of the illumination curve which are parallel to a central line in the illumination curve within a cutoff, and may be a value measured on a certain region having an area of 100 μm$^2$ on the first layer. If the first layer of the liquid crystal alignment film satisfies the above-described range of the maximum height roughness, a height difference between the groove region filled with the light blocking material or the like and the other regions which are not filled can be reduced. Therefore, when a polarizing plate is attached to the liquid crystal alignment film, separation does not occur and thus can be usefully applied to manufacturing an integrated polarizing plate for an optical filter to be described later.

This application also relates to a manufacturing method of the liquid crystal alignment film.

In one embodiment, the liquid crystal alignment film can be manufactured by a method including: granting a liquid crystal alignment ability to a surface of a layer that includes a groove having a width in the range of 5 μm to 300 μm and a depth in the range of 0.5 μm to 5 μm.

In one exemplary embodiment, the granting of a liquid crystal alignment ability to a surface of a layer that includes a groove may be carried out by, for example, forming a first layer including a groove on the surface and forming a liquid crystal alignment layer on the first layer's surface including the groove. FIG. 7 shows a schematic of an illustrative embodiment of a manufacturing method of a liquid crystal alignment film. Referring to FIG. 7, the liquid crystal alignment film can be manufactured by forming the underlying layer 103, for example, a trench film, including a groove on the substrate layer 105 as shown in a step (a), filling the groove with the light blocking material 106 or the light blocking material 106 and the light reflecting material 107 as shown in a step (b), and forming the liquid crystal alignment layer 104 as shown in a step (c). Further, as described below, when the liquid crystal alignment film is applied to an optical filter, in addition to the steps (a), (b), and (c), a step (d) may be added to form a liquid crystal layer including a first region 201 and a second region 202 different from each other in a phase retardation property on the liquid crystal alignment layer 104, so that an optical filter can be manufactured.

The forming of the groove in the first layer may be carried out by, for example, forming an concave-convex surface on the underlying layer. A method of forming the concave-convex surface on the underlying layer is not particularly limited, and for example, while a coating layer of a resin composition for forming the underlying layer is brought in contact with a mold having a targeted concave-convex structure, the resin composition may be cured, thereby forming the concave-convex structure. In another embodiment, forming the groove in the first layer may be carried out by, for example, forming the concave-convex surface on the substrate layer, and the concave-convex surface of the substrate layer may be formed by, for example, a printing method or a laser processing method.

The forming of the liquid crystal alignment layer on the first layer may be carried out by, for example, a method of forming and rubbing-aligning a polymer film such as polyimide on the first layer, a method of coating a photo-alignment compound and performing an alignment process through irradiation of linearly polarized light, or an imprint lithography such as nanoimprint lithography.

In another embodiment, the granting of a liquid crystal alignment ability to a surface of a layer that includes a groove may be carried out by forming a liquid crystal alignment layer and thereafter forming a groove on the surface of the liquid crystal alignment layer. The groove may be formed by, for example, a printing method or a laser processing method.

In one embodiment, the granting of a liquid crystal alignment ability may be carried out such that the liquid crystal alignment film can have a first alignment region and a second alignment region which have different alignment abilities from each other. In one embodiment, the liquid crystal alignment film may be manufactured such that the first alignment region and the second alignment region are formed in stripe shapes extending in the same direction and are alternately arranged adjacent to each other. In one embodiment, the liquid crystal alignment film may be manufactured such that the grooves present under the liquid crystal alignment layer can be overlapped with the first alignment region and the second alignment region on the border between the first alignment region and the second alignment region when observed from a direction of a normal line of the surface of the liquid crystal alignment film.

Further, the manufacturing method of the liquid crystal alignment film may further include filling the groove with the light blocking material, the light reflecting material, or the light scattering material before the liquid crystal alignment layer is formed. A method of filling the groove with the light blocking material, the light reflecting material, or the light scattering material is not particularly limited and may employ, for example, a printing method such as a screen printing method or a gravure printing method, or a selective ink jetting method.

This application also relates to an optical filter. In one embodiment, an optical filter may include a liquid crystal alignment film and a liquid crystal layer. The liquid crystal layer may be present on the liquid crystal alignment film. The above descriptions regarding the exemplary liquid crystal alignment film of the present invention can be equally applied to the liquid crystal alignment film, and the liquid crystal layer may include, for example, a first region and a second region different from each other in a phase retardation property.

For example, the optical filter may be a device configured to split incident light into two or more kinds of light different from each other in a polarization state. Such a device can be used for, for example, realizing a stereoscopic image.

The liquid crystal layer may include the first region and the second region which are different from each other in the phase retardation property. In the present specification, the expression "a first region and a second region are different from each other in the phase retardation property" may include, for example, a case where the first region and the second region have optical axes formed in directions identical to or different from each other and have phase retardation values different from each other and a case where the first region and the second region have the same phase retardation value and have optical axes formed in directions different from each other, when the first region and the second region have phase retardation properties.

In another embodiment, the expression "a first region and a second region different from each other in the phase retardation property" may include a case where any one region of the first region and a second region has a phase retardation property and the other region does not have a phase retardation property and is optically isotropic. In this case, both a region where the liquid crystal layer is formed and a region where the liquid crystal layer is not formed may be included. The phase retardation property of the first region or the second region can be controlled by adjusting, for example, an alignment state of a liquid crystal compound, a relationship of refractive indexes in the liquid crystal layer, or a thickness of the liquid crystal layer.

In one embodiment, the liquid crystal alignment film may include two or more grooves, and the two or more grooves may be formed in stripe shapes extending in the same direction and may be separately arranged from each other. In this case, the first region and the second region may be formed in stripe shapes extending in the same direction and may be alternately arranged adjacent to each other, and the grooves may be overlapped with the first region or the second region on the border between the first region and the second region when observed from a direction of a normal line of the surface of the liquid crystal alignment film. FIG. 8 illustrates an exemplary optical filter in which grooves 102 formed in a surface having a liquid crystal alignment ability 101 in a liquid crystal alignment film are arranged to be overlapped with a first region 201 and a second region 202.

In another embodiment, the first region and the second region may be alternately arranged to be adjacent to each other in a lattice pattern. In this case, the first region and the second region may be alternately arranged to be adjacent to each other in a lattice pattern, and also, the grooves may be overlapped with the first region or the second region on the border between the first region and the second region when observed from the direction of the normal line of the surface of the liquid crystal alignment film.

In one embodiment, when the optical filer is used in a device that displays a stereoscopic image, any one of the first and second regions may refer to a region for controlling the polarization state of a signal for a left eye (hereinafter, referred to as "LG region"), and the other region may refer to a region for controlling the polarization state of a signal for a right eye (hereinafter referred to as "RG region"). In another embodiment, when the optical filer is used in a device that displays a stereoscopic image, the groove region filled with the light blocking material may refer to a light-penetration-controlling region (hereinafter, referred to as "TC region").

In one embodiment, the two or more kinds of light different from each other in a polarization state and split by the liquid crystal layer including the first region and the second region may include two kinds of linearly polarized light having substantially vertical directions to each other, or may include left-circularly polarized light and right-circularly polarized light.

Unless otherwise defined in this specification, when terms such as vertical, horizontal, perpendicular, or parallel are used in definitions of angles, the terms refer to an angle being substantially vertical, horizontal, perpendicular, or parallel. For example, the terms include errors in consideration of manufacturing errors or variations. Therefore, the terms may include, for example, an error of less than about ±15°, an error of less than about ±10°, or an error of less than about ±5°.

In another embodiment, any one of the first and second regions may be a region through which incident light penetrates without rotating the polarization axis of the incident light, and the other region may be a region through which incident light penetrates while the polarization axis of the incident light is rotated in a direction perpendicular to the polarization axis of the incident light which penetrates through the one of the first and second regions. In this case, the regions of the liquid crystal layer including a polymerizable liquid crystal compound may be formed on only one of the first and second regions. The region in which the liquid crystal layer is not formed may be empty, or may be a region in which a glass or optically isotropic resin layer, or a resin film or sheet is formed.

In another embodiment, any one of the first and second regions may be a region through which incident light can penetrate when the incident light is converted into left-circularly polarized light, and the other region may be a region through which incident light can penetrate when the incident light is converted into right-circularly polarized light. In this case, the first and second regions have optical axes formed in different directions and have the same phase retardation value, or one of the first and second regions may be a region in which incident light may be phase-retarded by ¼ of a wavelength of the incident light, and the other region may be a region in which incident light may be phase-retarded by ¾ of a wavelength of the incident light.

In one embodiment, the first and second regions may have the same phase retardation value, for example, a value required to phase-retard incident light by ¼ of a wavelength of the incident light, and also have optical axes formed in different directions. The optical axes formed in the different directions may be, for example, at an angle of about 90°.

For example, the liquid crystal layer may have a difference between in-plane refractive indexes in a slow axis direction and in-plane refractive indexes in a fast axis direction in the range of 0.05 to 0.2, 0.07 to 0.2, 0.09 to 0.2, or 0.1 to 0.2. The in-plane refractive index in the slow axis direction may refer to a refractive index in a direction in which the maximum value of the refractive index is defined with respect to the plane of the liquid crystal layer, and the in-plane refractive index in the fast axis direction may refer to a refractive index in a direction in which the minimum value of the refractive index is defined with respect to the plane of the liquid crystal layer. Typically, the fast axis and slow axis in an optically anisotropic liquid crystal layer are formed vertically to each other. The refractive indexes may be measured with respect to light at a wavelength of 550 nm or 589 nm. The liquid crystal layer may also have a thickness of about 0.5 µm to about 2.0 µm or about 0.5 µm to about 1.5 µm. The liquid crystal layer satisfying the relationship of the refractive indexes and having the thickness may express a phase retardation property suitable for use in applications. The liquid crystal layer satisfying the relationship of the refractive indexes and having the thickness may be suitable for use in an optical filer for optical division.

The liquid crystal layer may be, for example, a photocrosslinking layer or a photopolymerizable layer of a photocrosslinking or photopolymerizable liquid crystal compound, respectively. In this technical field, various liquid crystal compounds having the above-described properties are publicly known and may include, for example, Reactive Mesogen (RM) of Merk or LG242 of BASF.

The liquid crystal layer may contain, for example, a multifunctional polymerizable liquid crystal compound and a monofunctional polymerizable liquid crystal compound. The polymerizable liquid crystal compounds may be contained in a polymerized form in the liquid crystal layer.

The term "multifunctional polymerizable liquid crystal compound" may refer to a compound that has a liquid crystalline property since it includes a mesogen backbone, and also has two or more polymerizable functional groups. According to one exemplary embodiment, the multifunctional polymerizable liquid crystal compound may include 2 to 10, 2 to 8, 2 to 6, 2 to 5, 2 to 4, 2 to 3, or 2 polymerizable functional groups.

The term "monofunctional polymerizable liquid crystal compound" may refer to a compound that has a liquid crystalline property since it includes a mesogen backbone, and has one polymerizable functional group.

Also, the expression "polymerizable liquid crystal compound contained in a polymerized form in a liquid crystal layer" may refer to a state where the liquid crystal compound is polymerized so as to form a liquid crystal polymer in the liquid crystal layer.

If the liquid crystal layer includes both of the multifunctional and monofunctional polymerizable compounds, the liquid crystal layer may have more excellent phase retardation properties, and the realized phase retardation properties, for example, the optical axis and a phase retardation value of the liquid crystal layer, may be stably maintained even under severe conditions.

According to one exemplary embodiment, the polymerizable liquid crystal compound may be a compound represented by the following Chemical Formula 1.

[Chemical Formula 1]

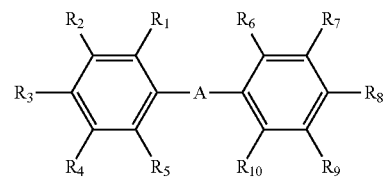

In Chemical Formula 1, A may be a single bond, —COO—, or —OCO—, and $R_1$ to $R_{10}$ may be each independently hydrogen, a halogen, an alkyl group, an alkoxy group, an alkoxycarbonyl group, a cyano group, a nitro group, —O-Q-P—, or a substituent represented by the following Chemical Formula 2, or a pair of two adjacent substituents among $R_1$ to $R_5$ or a pair of two adjacent substituents among $R_6$ to $R_{10}$ is joined together to form benzene substituted with —O-Q-P—, with the proviso that at least one of the $R_1$ to $R_{10}$ is —O-Q-P— or a substituent of Chemical Formula 2, or at least one pair of two adjacent substituents among $R_1$ to $R_5$ or among $R_6$ to $R_{10}$ is joined together to form benzene substituted with —O-Q-P—, where Q may be an alkylene group or an alkylidene group, and P may be a polymerizable functional group such as an alkenyl group, an epoxy group, a cyano group, a carboxyl group, an acryloyl group, a methacryloyl group, an acryloyloxy group, or a methacryloyloxy group.

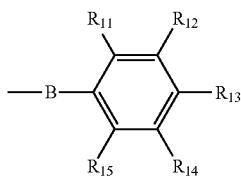

[Chemical Formula 2]

In Chemical Formula 2, B may be a single bond, —COO—, or —OCO—, and $R_{11}$ to $R_{15}$ may be each independently hydrogen, a halogen, an alkyl group, an alkoxy group, an alkoxycarbonyl group, a cyano group, a nitro group or —O-Q-P—, or at least one pair of two adjacent substituents among $R_1$ to $R_5$ or among $R_6$ to $R_{10}$ is joined together to form benzene substituted with —O-Q-P— with the proviso that at least one of substituents $R_{11}$ to $R_1$ is —O-Q-P—, or at least one pair of two adjacent substituents among $R_{11}$ to $R_1$ is joined together to form benzene substituted with —O-Q-P—, where Q may be an alkylene group or an alkylidene group, and P may be a polymerizable functional group such as an alkenyl group, an epoxy group, a cyano group, a carboxyl group, an acryloyl group, a methacryloyl group, an acryloyloxy group, or a methacryloyloxy group.

In Chemical Formulas 1 and 2, the expression "two adjacent substituents are joined together to form benzene substituted with O-Q-P—" may refer to the two adjacent substituents being joined together so as to form a naphthalene backbone substituted with O-Q-P— as a whole.

In Chemical Formula 2, the mark "—" indicated on the left of the "B" may refer to the "B" being directly bound to the benzene of Chemical Formula 1.

In Chemical Formulas 1 and 2, the term "single bond" means that no atom is present in a site represented by the "A" or "B." For example, if the "A" in Chemical Formula 1 is a single bond, the benzene disposed on both sides of the "A" may be directly bound to form a biphenyl structure.

In Chemical Formulas 1 and 2, the halogen may be, for example, chlorine, bromine, or iodine.

In Chemical Formulas 1 and 2, the term "alkyl group" may refer to a linear or branched alkyl group having 1 to 20 carbon atoms, 1 to 16 carbon atoms, 1 to 12 carbon atoms, 1 to 8 carbon atoms, or 1 to 4 carbon atoms; or a cycloalkyl group having 3 to 20 carbon atoms, 3 to 16 carbon atoms, or 4 to 12 carbon atoms. The alkyl group may be optionally substituted with one or more substituents.

Unless defined otherwise, the term "alkoxy group" as used in the present specification may refer to an alkoxy group having, for example, 1 to 20 carbon atoms, 1 to 16 carbon atoms, 1 to 12 carbon atoms, 1 to 8 carbon atoms, or 1 to 4 carbon atoms. For example, the alkoxy group may have a linear, branched, or cyclic structure. Also, the alkoxy group may be optionally substituted with one or more substituents.

Unless defined otherwise, the term "alkylene group" or "alkylidene group" as used in the present specification may refer to an alkylene group or alkylidene group having 1 to 12 carbon atoms, 4 to 10 carbon atoms, or 6 to 9 carbon atoms. The alkylene group or alkylidene group may have, for example, a linear, branched, or cyclic structure. Also, the alkylene group or alkylidene group may be optionally substituted with one or more substituents.

Unless defined otherwise, the term "alkenyl group" as used in the present specification may refer to an alkenyl group having 2 to 20 carbon atoms, 2 to 16 carbon atoms, 2 to 12 carbon atoms, 2 to 8 carbon atoms, or 2 to 4 carbon atoms. The alkenyl group may have a linear, branched, or cyclic structure. Also, the alkenyl group may be optionally substituted with one or more substituents.

Further, in Chemical Formulas 1 and 2, the "P" may be, for example, an acryloyl group, a methacryloyl group, an acryloyloxy group, or a methacryloyloxy group; or may be, for example, an acryloyloxy group or a methacryloyloxy group; or may be, for example, an acryloyloxy group.

For example, the liquid crystal layer may include the monofunctional polymerizable liquid crystal compound in an amount of greater than 0 part by weight and not greater than 100 parts by weight, 1 to 90 parts by weight, 1 to 80 parts by weight, 1 to 70 parts by weight, 1 to 60 parts by weight, 1 to 50 parts by weight, 1 to 30 parts by weight, or 1 to 20 parts by weight with respect to 100 parts by weight of the multifunctional polymerizable liquid crystal compound.

The effect obtained by mixing the multifunctional and monofunctional polymerizable liquid crystal compounds may be maximized within the above-described range. Also, the liquid crystal layer may exhibit an excellent adhesive property to an adhesive layer. Unless defined otherwise, the unit "part(s) by weight" may refer to a weight ratio.

The multifunctional and monofunctional polymerizable liquid crystal compounds may be included in the liquid crystal layer under the state where they are horizontally aligned. The term "being horizontally aligned" as used in the present specification may mean that the optical axis of the liquid crystal layer including a polymerized liquid crystal compound has an inclination angle of about 0° to about 25°, about 0° to about 15°, about 0° to about 10°, about 0° to about 5°, or about 0° with respect to the plane of the liquid crystal layer. The term "optical axis" as used in the present specification may refer to a fast axis or slow axis when incident light passes through a corresponding region.

In one embodiment, the optical filter may further include a polarizing layer formed on the liquid crystal layer. The polarizing layer is an optical element having a transmission axis and an absorption axis perpendicular to the transmission axis, and if light is incident, only a signal having a polarization axis parallel to the transmission axis can pass through the polarizing layer. In an exemplary liquid crystal alignment film, since a groove is filled with a light blocking material or the like, a height difference between a light blocking region and a region other than the light blocking region can be reduced. Therefore, separation does not occur even when an integrated polarizing plate for an optical filter is manufactured by attaching a polarizing plate to an optical filter as described above. In one embodiment, the transmission axis of the polarizing layer may be arranged to be vertical to a line bisecting an angle formed by the optical axes of the first and the second regions, and for example, the transmission axis of the polarizing layer may form an angle of 45° with the optical axis of the first region and may form an angle of −45° with the optical axis of the second region.

This application relates to a display device. A display device according to one embodiment may include the optical filter. The above descriptions regarding the exemplary optical filter of the present invention can be equally applied to the optical filter. In one embodiment, the display device may be a stereoscopic image display device (hereinafter, referred to as "3D device"). The display device may further include, for example, a displaying part. In one embodiment, the displaying part and the filtering part may be positioned so that signals emitted from the displaying part may penetrate the optical filter and then transferred toward an observer.

The displaying part may include a region (hereinafter, referred to as "RS region") for generating a signal for a right eye, configured to generate the signal (hereinafter, referred to as "R signal") for the right eye in a driving state, and a region (hereinafter, referred to as "LS region") for generating a signal for a left eye, configured to generate the signal (hereinafter, referred to as "L signal") for the left eye in a driving state. The term "driving state" as used herein may refer to a state where the display device such as the 3D device displays images such as stereoscopic images.

The displaying device may further include a light-penetration-controlling region (hereinafter, referred to as "TC region"), which is adjacent to the RS and LS regions. For convenience of explanation, in the present specification, a TC region included in the displaying part will be referred to as a first light-penetration-controlling region (hereinafter, referred to as"TC1 region"), and a TC region included in the optical filter will be referred to as a second light-penetration-controlling region (hereinafter, referred to as "TC2 region"). In the present specification, the term "TC region" as used herein may refer to a region that is formed so as to be capable of blocking lights entering into the region or allow only a part of lights entering into the region to go through the region. In one embodiment, the TC region may be a region of which the transmittance of lights entering into the region, i.e., the light transmittance is in the range from 0% to 20%, from 0% to 15%, from 0% to 10% or from 0% to 5%.

Also, the term "TC1 region being adjacent to the RS and LS regions" as used herein may refer to the TC1 region being positioned so that, in case where images are observed in at least one angle falling within the ranges of the viewing angles, at least a part of the R signal and/or L signal may enter into the TC1 region in the process that the R signal and/or L signal generated from the RS region and/or LS region is transferred toward the optical filter, and thereby the incident signal may be blocked by the TC1 region or only a part of the incident signal may go through the TC1 region, and then be transferred to the optical filter.

The term "viewing angles" as used herein may refer to the ranges of the angles, within which the L signal generated from the LS region may go through a region (hereinafter, referred to as "LG region") for controlling the polarization state of the L signal and may not go through a region (hereinafter, referred to as "RG region") for controlling the polarization state of the R signal, and then be transferred toward an observer, or within which the R signal generated from the RS region may go through the RG region and may not go through the LG region, and then be transferred toward an observer. At an angle exceeding the viewing angles, the L signal goes through the RG region, and then is transferred to an observer, or the R signal goes through the LG region, and then is transferred to an observer, and therefore a so-called crosstalk which lowers the quality of the image may occur.

In one embodiment, the TC1 region that is presented adjacent to the RS and LS regions may be between the RS and LS regions. Examples of the case where the TC1 region is between the RS and LS regions may include the case where the RS, TC1 and LS regions are sequentially positioned on the same plane, or the case where the TC1 region is positioned on the front or the back side of the plane, on which the RS and LS regions are positioned. In case where the TC1 region is positioned on the front or the back side of the plane, on which the RS and LS regions are positioned, the TC1 region may be presented so as to be overlapped with at least a part of the RS and/or LS region when the front side of the device is observed.

In one embodiment, the optical filter may include a polarization controlling part and the TC2 region adjacent to the polarization controlling part. As described above with respect to the optical filter, the liquid crystal layer including the first and second regions different from each other in a phase retardation property may correspond to the polarization controlling part in the optical filter, and the groove region filled with the light blocking material may correspond to the TC region in the optical filter.

In one embodiment, the polarization controlling part may include RG and LG regions. In one embodiment, the RG region may be, for example, in a position into which the R signal generated in the displaying part may enter in a driving state. Also, the LG region may be, for example, in a position into which the L signal generated in the displaying part may enter in a driving state. For example, one of the first and second regions in the liquid crystal layer may be the RG region and the other one may be the LG region.

The TC2 region may be positioned to be adjacent to the RG and LG regions. The term "TC2 region being adjacent to the RG and LG regions" as used herein may refer to the TC2 region being positioned so that, in case where images are observed in at least one angle falling within the ranges of the viewing angles, a part of the R signal and/or L signal may enter into the TC2 region before the R signal and/or L signal transferred from the displaying part enters into the RG region and/or LG region, in the process that the R signal and/or L signal transferred from the displaying part penetrates the RG and/or LG region, or after the R signal and/or L signal transferred from the displaying part penetrates the RG and/or LG region, and thereby the incident signal may be blocked by the TC2 region or only a part of the signal entering into the TC2 region may go through the TC2 region.

In one embodiment, the TC2 region that is presented to be adjacent to the RG and LG regions may be between the RG and LG regions. Examples of the case where the TC2 region is between the RG and LG regions may include the case where the TC2 region is positioned on the front side of the plane, on which the RG and LG regions are positioned. In case where the TC2 region is positioned on the front side of the plane, on which the RG and LG regions are positioned, the TC2 region may be positioned so as to be overlapped with at least a part of the RG and/or LG region when the front side of the device is observed.

A 3D device according to one embodiment may be a device, the image generated from which may be observed by an observer wearing glasses (hereinafter, referred to as "3D glasses") for observing stereoscopic images.

FIG. 9 shows a schematic of an illustrative embodiment of the 3D device of this application. Referring to FIG. 9, a 3D device 3 according to one embodiment may include a displaying part 301 and an optical filter 302. The displaying part 301 may include a light source 3011, a polarizing plate 3012 and an image-generating region 3013. The RS and LS regions may be included in the image-generating region 3013, and the polarizing plate 3012 and the light source 3011 may be included sequentially from one side of the image-generating region 3013.

As the light source 3011, for example, a direct-type or an edge-type backlight unit, which is generally used as a light source in a display device such as a LCD (Liquid Crystal Display) may be used. As the light source 3011, various kinds of devices other than the above may be used.

In the displaying part 301, the polarizing plate 3012 may be positioned between the light source 3011 and the image-generating region 3013. By the above arrangement, lights emitted from the light source 3011 may go through the polarizing plate 3012 and then enter into the image-generating region 3013. The polarizing plate may be an optical device in which a light transmission axis and a light absorption axis that is perpendicular to the light transmission axis formed. If lights enter into the polarizing plate, only lights having polarization axes parallel to the light transmission axis of polarizing plate among the incident lights may go through the polarizing plate. In this specification, in order to distinguish from the polarizing plate included in the optical filter as described below, the polarizing plate included in the displaying part is referred to as a "first polarizing plate," and the polarizing plate included in the optical filter is referred to as a "second polarizing plate."

The image-generating region 3013 may include the LS region configured to generate the L signal in a driving state, and the RS region configured to generate the R signal in a driving state.

In one embodiment, the image-generating region 3013 may be a region formed by a transmissive liquid crystal panel, which includes a liquid crystal layer interposed between two substrates, or a region formed inside of the liquid crystal panel. The liquid crystal panel may, for example, include a first substrate, a pixel electrode, a first alignment layer, a liquid crystal layer, a second alignment layer, a common electrode and a second substrate, which are sequentially arranged from the light source 3011. For example, as a drive element electrically connected to a transparent pixel electrode, an active drive circuit including a thin film transistor (TFT) and wires may be formed on the first substrate. The pixel electrode may, for example, include metal oxides such as indium tin oxide (ITO) and function as an electrode in each pixel. Also, the first and the second alignment layers may function, for example, to align the liquid crystals of the liquid crystal layer. The liquid crystal layer may include, for example, vertical alignment (VA), twisted nematic (TN), super-twisted nematic (STN) or in-plane switching (IPS) mode liquid crystals. The liquid crystal layer may have a function of passing lights from the light source 3011 through each pixel or intercepting the lights by each pixel according to a voltage applied from the drive circuit. For example, the common electrode may function as a common counter electrode.

In the image-generating region 3013, LS and RS regions, which are configured to generate L or R signal in a driving state, and which include at least one pixel, may be formed. For example, at least one unit pixel including liquid crystals encapsulated between the first and second alignment layers in the liquid crystal panel may form the LS or RS region. The LS and RS regions may be arranged in row and/or column directions.

FIGS. 10 and 11 show illustrative arrangements of the RS and LS regions. The illustrative arrangements shown in FIGS. 10 and 11 may be arrangements of the RS and LS regions in case where the front side of the 3D device is observed. In one embodiment, as shown in FIG. 10, the RS and LS regions may have stripe shapes extending in a common direction, for example, a lengthwise direction, and be alternately arranged adjacent to each other. In other embodiment, as shown in FIG. 11, the RS and LS regions may be alternately arranged adjacent to each other in a lattice pattern. However, the arrangement of the RS and LS regions is not limited to the arrangements shown in FIGS. 10 and 11, and a variety of designs may be applicable.

The displaying part 301 may generate signals including the R and L signals, for example, by driving pixels of respective regions according to signals in a driving state.

For example, referring to FIG. 9, if lights emitted from the light source 3011 enter into the first polarizing plate 3012, only lights which are polarized to be parallel to the light transmission axis of the polarizing plate 3012 can go through. The lights which have gone through the polarizing plate 3012 enter into the image-generating region 3013. The lights which enter into the image-generating region 3013 and go through the RS region may become the R signal, and the lights which enter into the image-generating region 3013 and go through the LS region may become the L signal.

The displaying part 301 may include the TC1 region. The TC1 region may be positioned to be adjacent to the RS and LS regions. In FIG. 9 showing a schematic of an illustrative embodiment of the device 3, the TC1 regions are positioned on the front side of the plane on which the RS and LS regions are formed in the image-generating region 3013, and also positioned to be overlapped with parts of the RS and LS regions between the RS and LS regions when the front side of the device is observed. However, the position of the TC1 regions is not limited to the arrangement in FIG. 9. For example, the TC1 regions may be positioned on the back side of the plane on which the RS and LS regions are formed, or, for example, as shown in FIG. 18 below, the TC1 regions may be positioned on the same plane on which the RS and LS regions are formed. FIG. 12 shows a schematic of an illustrative arrangement of the LS and RS regions in FIG. 10 considering the presence of the TC1 regions, and FIG. 13 shows a schematic of an illustrative arrangement of the LS and RS regions in FIG. 11 considering the presence of the TC1 regions. In FIGS. 12 and 13, the TC1 regions are represented by diagonal lines.

For example, the TC1 region in combination with the TC2 region may make it possible for the 3D device to display an image in wide viewing angles without losses of the brightness.

In one embodiment, the TC1 region may be a black matrix. For example, in case where the image-generating region 3013 is a region formed by or inside of the transmissive liquid crystal panel, the TC1 region may be a black matrix included in a color filter which is generally presented in the second substrate that is conventionally included in the liquid crystal panel as described above. In one embodiment, TC1 region may be a region including chromium (Cr), a double layer (a double layer of Cr/CrOx) of chromium and chromium oxide, a resin layer including a pigment such as carbon pigment, carbon black or graphite. A method for forming the TC1 region by using the above materials is not particularly limited. For example, the TC1 region may be formed by photolithography or lift off method which is a conventional method for forming a black matrix.

In the 3D device, the optical filter may, for example, include a polarization controlling part 3022, and may further include the second polarizing plate 3021 as illustrated in FIG. 9. The second polarizing plate may be the polarizing layer of the above-described optical filter. The second polarizing plate 3021 may be included between the displaying part 301 and the polarization controlling part 3022. The polarization controlling part 3022 may include the LG and RG regions. Also, the TC2 region may be positioned to be adjacent to the LG and RG regions. In FIG. 19 showing a schematic of an illustrative embodiment of the device 3, TC2 region is positioned between the RG and LG regions, and on the front side of the plane on which the RG and LG regions are positioned so as to be overlapped with parts of the RG and LG regions. By the above, signals emitted from the image-generating region 3013 can go through the second polarizing plate 3021 and the polarization controlling part 3022 sequentially and then be transferred to an observer. Also, when being observed in at least one angle falling within the viewing angles, at least a part of the L and/or R signal can enter into the TC2 region before entering into the LG and/or RG regions, in the process of penetrating the LG and/or RG region or after penetrating the LG and/or RG regions.

In one embodiment, the first and second polarizing plates 3012 and 3021 included in the 3D device 3 may be arranged so that the light absorption axes of the first and second polarizing plates 3012 and 3021 may be perpendicular to each other. The light transmission axes of the first and second polarizing plates 3012 and 3021 may also be perpendicular to each other. In the above, the term "being perpendicular to each other" may mean "being substantially perpendicular to each other," and may include an error within ±15 degrees, ±10 degrees or ±5 degrees.

The RG and LG regions included in the polarization controlling part 3022 may be regions configured to control the polarization states of the R and L signals, respectively. In one embodiment, the RG and LG regions may be regions, by which the R and L signals can be emitted from the 3D device under the condition where they have different polarization states from each other.

In one embodiment, in order for the R signal generated and transferred from the RS region in a driving state to be entered into, the RG region may have a size corresponding approximatively to a size of the RS region and be in a position corresponding approximatively to a position of the RS region, and in order for the L signal generated and transferred from the LS region to be entered into, the LG region may have a size corresponding approximatively to a size of the LS region and be in a position corresponding approximatively to a position of the LS region. The RG or LG region having a size corresponding approximatively to a size of the RS or LS region and being in a position corresponding approximatively to a position of the RS or LS region may mean that the RG and LG region should have a size and a position enough for the R and L signals generated from the RS and LS regions respectively to be entered into the RS and LS region respectively, and don't mean that the RG or LG region has the same size and position as the RS or LS region.

In one embodiment, corresponding to the arrangement of the RS and LS regions in the displaying part, the RG and LG regions may be formed to have stripe shapes extending in a common direction, for example, a lengthwise direction, and be alternately arranged adjacent to each other, or may be alternately arranged adjacent to each other in a lattice pattern. For example, in case where the RS and LS regions are arranged as in FIG. 10, the RG and LG regions may be arranged as in FIG. 14, or in case where the RS and LS regions are arranged as in FIG. 11, the RG and LG regions may be arranged as in FIG. 15. FIG. 16 shows a schematic of an illustrative arrangement of the LG and RG regions in FIG. 14 considering the presence of the TC2 regions, and 17 shows a schematic of an illustrative arrangement of the LG and RG regions in FIG. 15 considering the presence of the TC2 regions. In FIGS. 16 and 17, the TC2 regions are represented by diagonal lines.

FIG. 16 shows a schematic of an illustrative embodiment of the arrangement of the LG and RG regions illustrated in FIG. 14 again in view of presence of the TC2. FIG. 17 show a schematics of an illustrative embodiment of the arrangement of the LG and RG regions illustrated in FIG. 15 again in view of presence of the TC2. In FIGS. 16 and 17, the TC2 regions are marked with slanting lines.

In one embodiment, the R and L signals which have gone through the RG and LG regions respectively may be linearly polarized signals of which polarized direction are substantially perpendicular to each other. In another embodiment, one signal among the R and L signals which have gone through the RG and LG regions respectively may be a left-circularly polarized signal, and the other signal may be a right-circularly polarized signal. For the above, at least one region among the LG and RG regions may include a phase retardation layer. For example, the phase retardation layer may be a liquid crystal layer of the above-described optical filter.

For example, the case where the left-circularly and right circularly polarized signals can be generated may include the case where both of the RG and LG regions include the phase retardation layers and the phase retardation layers included in the RG and LG regions are $\lambda/4$ wavelength layers. In order to form circularly polarized lights of which rotating directions are opposite to each other, an optical axis of the $\lambda/4$ wavelength layer disposed in the RG region may have a different direction from that of an optical axis of the $\lambda/4$ wavelength layer disposed in the LG region. In one embodiment, the RG region may include a $\lambda/4$ wavelength layer having an optical axis formed in a first direction, and the LG region may include a $\lambda/4$ wavelength layer having an optical axis formed in a second direction which is different from the first direction. The term "n$\lambda$ wavelength layer" as used herein may refer to a phase retardation device capable of phase-retarding incident light by n times of its wavelength, and the "n" may be, for example, ½, ¼ or ¾. Also, the term "optical axis" as used herein may refer to a fast axis or a slow axis when incident light passes through a corresponding region, and may, for example, be the slow axis.

The embodiment of the RG and LG regions is not limited to the above. For example, the right-circularly and the left-circularly polarized lights may also be generated in case where one region among the RG and LG regions includes a $3\lambda/4$ wavelength layer and the other region includes a $\lambda/4$ wavelength layer.

In another embodiment, one region among the RG and LG regions may be a $\lambda/2$ wavelength layer and the other region may be an optically isotropic region. In this case, R and L signals that have gone through the RG and LG regions respectively may be emitted from the 3D device in the form of linearly polarized lights having polarized axes substantially perpendicular to each other.

In one embodiment, the TC2 region may be positioned in the side, opposite to the displaying part, of the polarization controlling part. Under such state, when the front side of the device is observed, the TC2 region may be positioned to be overlapped with at least a part of the RG or LG region or at least parts of the RG and LG regions. FIG. 18 shows a schematic of an illustrative embodiment of a 3D device, in which the TC2 region is positioned in the side, opposite to the displaying part, of the polarization controlling part. As shown in FIG. 18, the TC2 region may be positioned, for example, to come in contact with the side, opposite to the side coming in contact with the second polarizing plate 3021, of the polarization controlling part 3022 and be positioned to be overlapped with at least a part of the RG and/or LG region.

A 3D device according to one embodiment may include the TC1 and TC2 regions, and therefore may display stereoscopic images in wider viewing angles without losses of the brightness.

In one embodiment, the TC1 and TC2 regions may satisfy the following Formula 1. In the range satisfying the following Formula 1, the brightness of the 3D device may be appropriately obtained and wide viewing angles may be displayed.

$$H_1+H_2 \le (P_L+P_R)/2 \quad \text{[Formula 1]}$$

In Formula 1, $H_1$ is the width of the TC1 region, $H_2$ is the width of the TC2 region, $P_L$ is the width of the LG region and $P_R$ is the width of the RG region.

FIG. 18 shows a schematic of an illustrative embodiment of the case where only the image-generating region 3013 and the optical filter 302 including the second polarizing plate 3021 and the polarization state-controlling part 3022 of the 3D device are observed from the side. In FIG. 18, the "$H_1$," "$H_2$," "$P_L$" and "$P_R$" are expressed, respectively.

In the 3D device, specific ranges of the "$H_1$" and "$H_2$" may be appropriately selected considering the ranges satisfying the Formula 1 according to concrete specifications of the 3D device, and specific values thereof are not particularly limited. In one embodiment, the "$H_2$" may be, for example, more than 0 μm and also not more than 1,000 μm. The lowest limit of the "$H_2$" may be, for example, 20 μm, 25 μm, 30 μm, 35 μm, 40 μm, 45 μm, 50 μm, 55 μm, 60 μm, 65 μm, 70 μm, 75 on or 80 μm. Also, the upper limit of the "$H_2$" may be, for example, 900 μm, 800 μm, 700 μm, 600 μm, 500 μm, 400 μm, 300 μm, 290 μm, 280 μm, 270 μm, 260 μm, 250 μm, 240 μm, 230 μm, 220 μm, 210 μm or 200 μm. The range of the "$H_2$" may be defined by selecting and combining the above lowest limits and upper limits respectively.

Also, the "$H_1$" may be selected so as for the sum of the "$H_1$" and "$H_2$" to be more than 0 on and also not more than 2,000 on. The lowest limit of the sum of the "$H_1$" and "$H_2$" may be, for example, 40 μm, 50 μm, 60 μm, 70 μm, 80 μm, 90 μm, 100 μm, 110 μm, 120 μm, 130 μm, 140 μm, 150 μm or 160 μm. Also, the upper limit of the sum of the "$H_1$" and "$H_2$" may be, for example, 1900 μm, 1800 μm, 1700 μm, 1600 μm, 1500 μm, 1400 μm, 1300 μm, 1200 μm, 1100 μm, 1000 μm, 900 μm, 800 μm, 700 μm, 600 μm, 500 μm, 400 μm or 300 μm. The range of the sum of the "$H_1$" and "$H_2$" may be defined by selecting and combining the above lowest limits and upper limits respectively.

Also, in the 3D device, specific ranges of the "$P_L$" and "$P_R$" may be appropriately selected according to concrete specifications of the 3D device, and specific values thereof are not particularly limited. In one embodiment, if the device is a 47 inch device, the specific ranges of the "$P_R$" and "$P_L$" may be, for example, selected to be from 150 on to 350 μm, respectively. Considering conventional specifications of the device, the specific ranges of the "$P_R$" and "$P_L$" may be, for example, from 150 on to 1,000 μm, respectively.

In the 3D device, the width "$H_2$" of the TC2 region may be the same as or shorter than the width "$H_1$" of the TC1 region. In one embodiment, the difference ($H_1-H_2$) between the width "$H_1$" of the TC1 region and the width "$H_2$" of the TC2 region may be, for example, within 1,000 μm, within 900 μm, within 800 μm, within 700 μm, within 600 μm, within 500 μm, within 400 μm, within 300 μm, within 175 μm, within 150 μm, within 125 μm, within 100 μm, within 75 μm, within 50 μm or within 25 μm or may be substantially 0 μm. Under the above state, the wide viewing angles of the 3D device may be secured without losses of the brightness.

In one embodiment, in the device, the relative brightness observed from the front side of the display device may be not less than 60%, not less than 65% or not less than 70%. The term "relative brightness" as used herein may refer to a ratio ($I_T/I_O$) of the brightness ($I_T$) of the device in which the TC1 and TC2 regions are formed with respect to the brightness ($I_O$) of the device in which both of the TC1 and TC2 regions are not formed.

Also, in the 3D device, for example, both of the maximum value of the angle $\theta_U$ satisfying the following Formula 2 and the maximum value of the angle $\theta_L$ satisfying the following Formula 3 may be 3 degrees or more, 5 degrees or more, 8 degrees or more, 8.5 degrees or more, 9 degrees or more, 9.5 degrees or more, 10 degrees or more, 10.5 degrees or more, 11 degrees or more, 11.5 degrees or more, 12 degrees or more, 12.5 degrees or more, 13 degrees or more, 13.5 degrees or more, 14 degrees or more, 14.5 degrees or more, or 15 degrees or more.

$$\tan \theta_U = (H_1+2y)/2T \quad \text{[Formula 2]}$$

$$\tan \theta_L = (H_1+2H_2-2y)/2T \quad \text{[Formula 3]}$$

In Formulas 2 and 3, $H_1$ represents a width of the TC1 region, $H_2$ represents a width of the TC2 region, T represents a distance from the displaying part to the optical filter, and y represents a distance from the point at which a hypothetical normal of a line bisecting the width of the TC1 region with respect to a surface of the TC1 region comes in contact with the TC2 region to the point at which the TC2 region is present.

The "$\theta_U$" and "$\theta_L$" may, for example, mean the viewing angles of the 3D device, respectively. Referring FIG. 19, the Formulas 2 and 3 are further explained as below.

On the assumption that the term "viewing angles" refer to the ranges of the angles, within which the L signal generated from the image-generating region may go through the LG region and may not go through the RG region, and then be transferred toward an observer, or within which the R signal generated from the image-generating region may go through the RG region and may not go through the LG region, and then be transferred toward an observer, the above viewing angles are expressed as the "$\theta_U$" and "$\theta_L$," respectively, in FIG. 19.

As in FIG. 19, the viewing angles may be determined according to the distance "T" from the image-generating region to the optical filter, and the widths of the TC1 and TC2 regions. In the above, the distance "T" from the image-generating region to the optical filter may refer to, for example, the distance from the image-generating region's side facing the optical filter to the point at which the TC2 region of the optical filter ends. In one embodiment, in case where the image-generating region is the region formed by the liquid crystal panel, the image-generating region's side facing the optical filter may mean the side facing the optical filter of the liquid crystal layer in the liquid crystal panel.

The distance "T" may be determined according to a specification of the 3D device, and is not particularly limited. In one embodiment, the distance "T" may be, for example, 5 mm or less or from about 0.5 mm to 5 mm.

Referring to FIG. 19, it can be seen that, in case where the distance "T" is fixed, the viewing angles "$\theta_U$" and "$\theta_L$" may be determined by the widths $H_1$ and $H_2$, and relative positions of the TC1 and TC2 regions.

That is, referring to FIG. 19, it can be confirmed that the viewing angle "$\theta_U$" may be formed so as for the value of tan $\theta_U$ to become identical to the value of the sum ($H_1/2+y$) of ½ times as long as the width "H1" of the TC1 region and the distance y from the point, at which a hypothetical normal "C" of a line bisecting the width of the TC1 region with respect to the surface of the TC1 region or the image-generating region comes in contact with the TC2 region, to the point on which the TC2 region is presented, divided by the distance "T." Also, it can be confirmed that the viewing angle "$θ_L$" may be formed so as for the value of tank to become identical to the value of the sum ($H_1/2+H_2-y$) of ½ times as long as the width "$H_1$" of the TC1 region and the width $H_2$ of the TC2 region minus the distance y from the point, at which a hypothetical normal "C" of a line bisecting the TC1 region with respect to the surface of the TC1 region or the image-generating region comes in contact with the TC2 region, to the point on which the TC2 region is presented, divided by the distance "T."

In the 3D device including the TC1 and TC2 regions, when observing stereoscopic images, wide viewing angles along with excellent brightness properties can be secured by controlling the sizes such as the widths and the relative positions of the TC1 and TC2 regions.

A 3D device according to one embodiment may have the relative brightness observed from the front side thereof of 60% or more, 65% or more or 70% or more, and, at the same time, may have the maximum value of the angle "$θ_U$" satisfying the Formula 2 and the maximum value of the angle "$θ_L$" satisfying the Formula 3, both of which are 3 degrees or more, 5 degrees or more, 8 degrees or more, 8.5 degrees or more, 9 degrees or more, 9.5 degrees or more, 10 degrees or more, 10.5 degrees or more, 11 degrees or more, 11.5 degrees or more, 12 degrees or more, 12.5 degrees or more, 13 degrees or more, 13.5 degrees or more, 14 degrees or more, 14.5 degrees or more, or 15 degrees or more.

Further, the stereoscopic image display device can be manufactured by employing various methods publicly known in the art as long as the optical filter is included as an element for optical division.

Technical Effects

With an exemplary liquid crystal alignment film, film, for example, a stereoscopic image can be displayed in wide viewing angles without losses of the brightness.

BRIEF DESCRIPTION OF THE DRAWINGS

FIGS. 10 to 13 show schematics of the illustrative embodiments of the arrangements of LS, RS and TC1 regions.

FIGS. 14 to 17 show schematics of the illustrative embodiments of the arrangements of LG, RG and TC2 regions.

ILLUSTRATIVE EMBODIMENTS

Hereinafter, the above-described liquid crystal alignment film will be explained in more detail with reference to Examples and Comparative Example, but the scope of the liquid crystal alignment film is not limited to the following Examples.

Example 1

Figure 1:
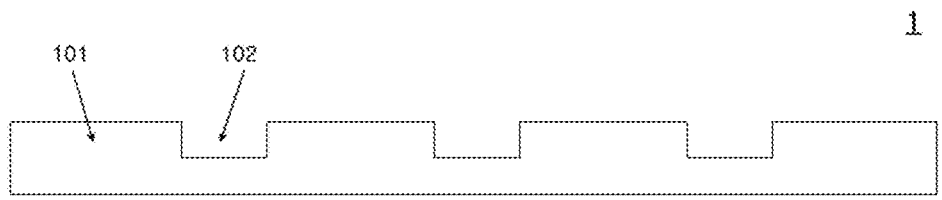
FIGS. 1 to 6 show schematics of the illustrative embodiments of the liquid crystal alignment films.
Figure 2:
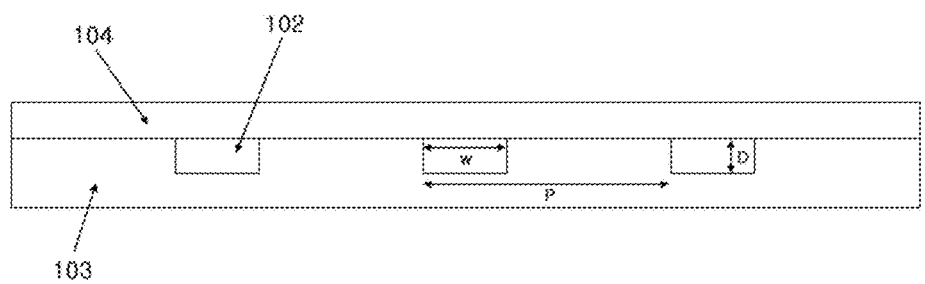
Figure 3:
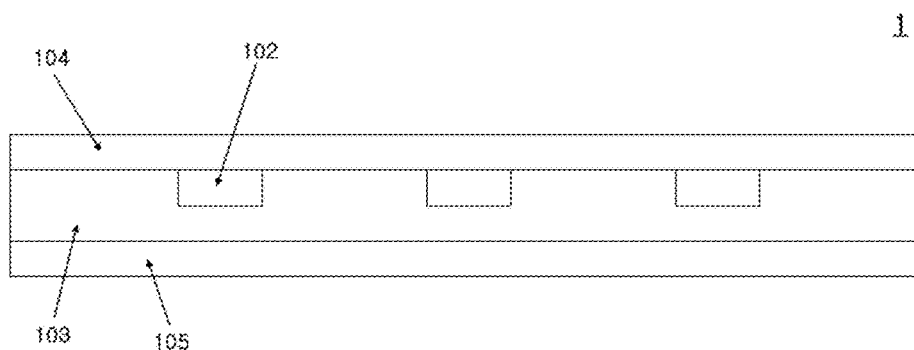
Figure 4:
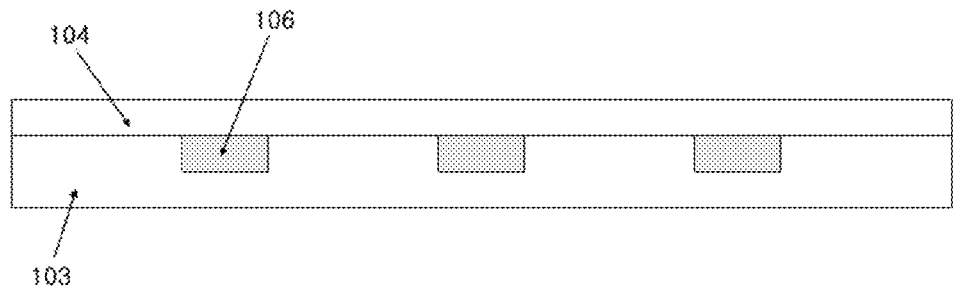
Figure 5:
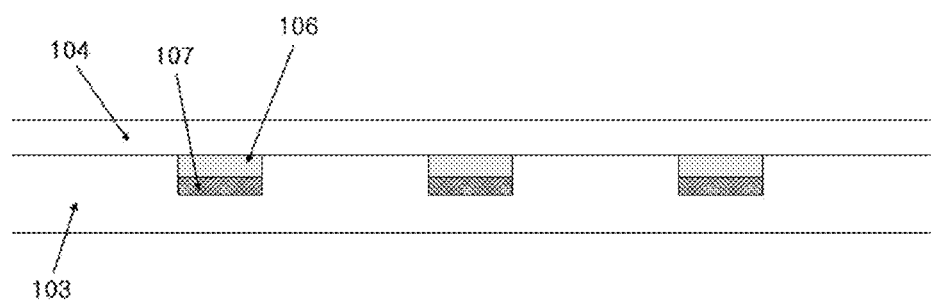
Figure 6:
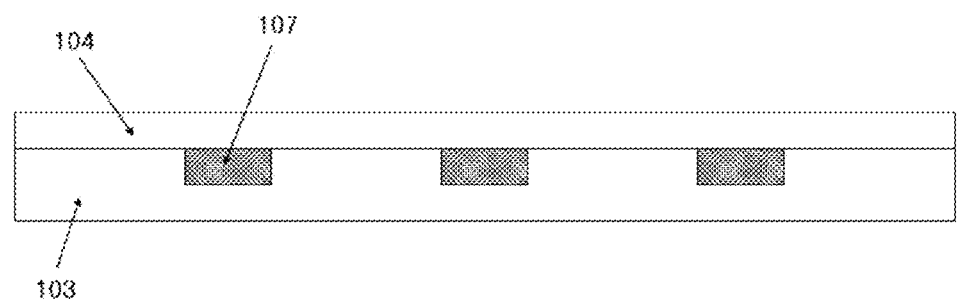
Figure 7:
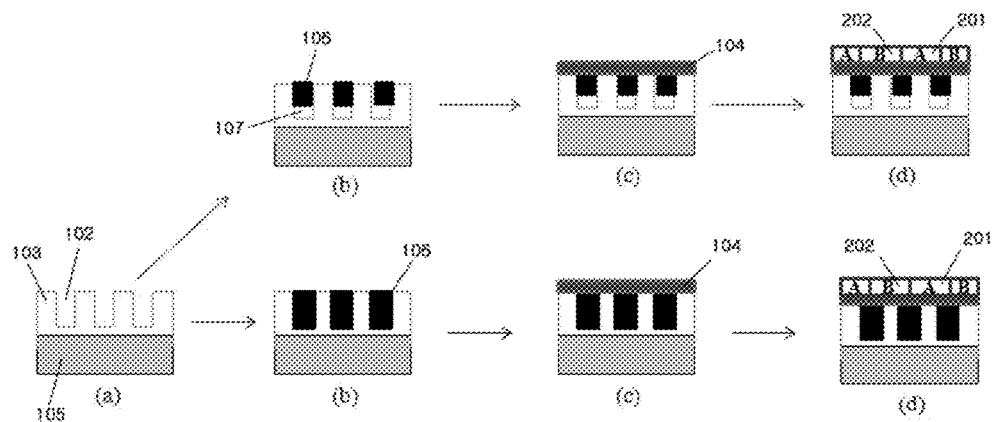
FIG. 7 shows a schematic of an illustrative embodiment of a manufacturing method of a liquid crystal alignment film.
Figure 8:
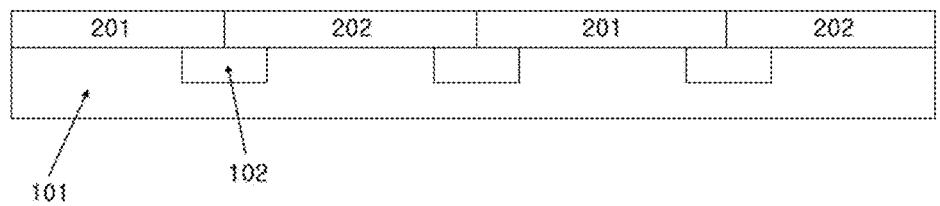
FIG. 8 shows a schematic of an illustrative embodiment of an optical filter.
Figure 9:
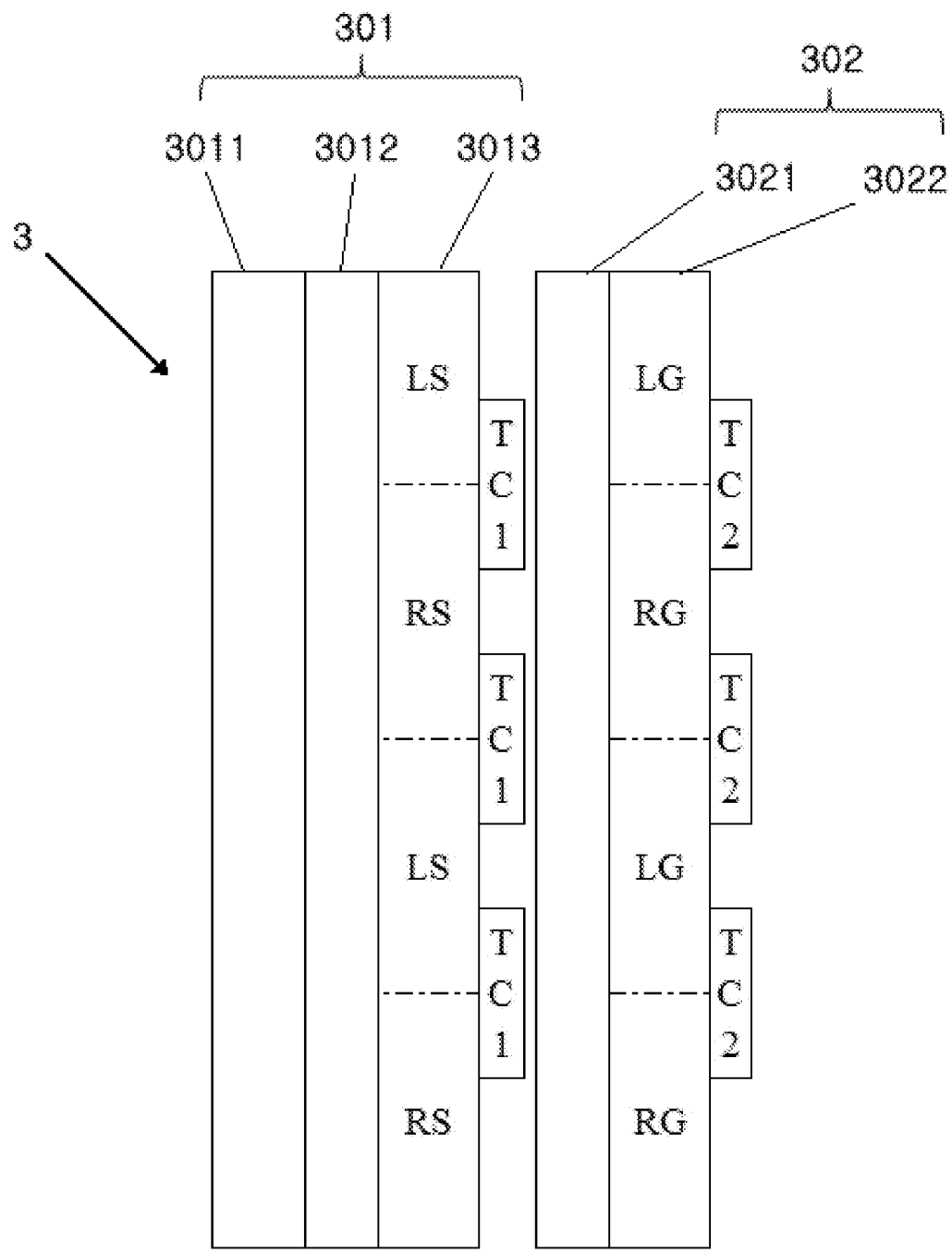
FIG. 9 shows a schematic of an illustrative embodiment of a 3D device.
Figure 12:
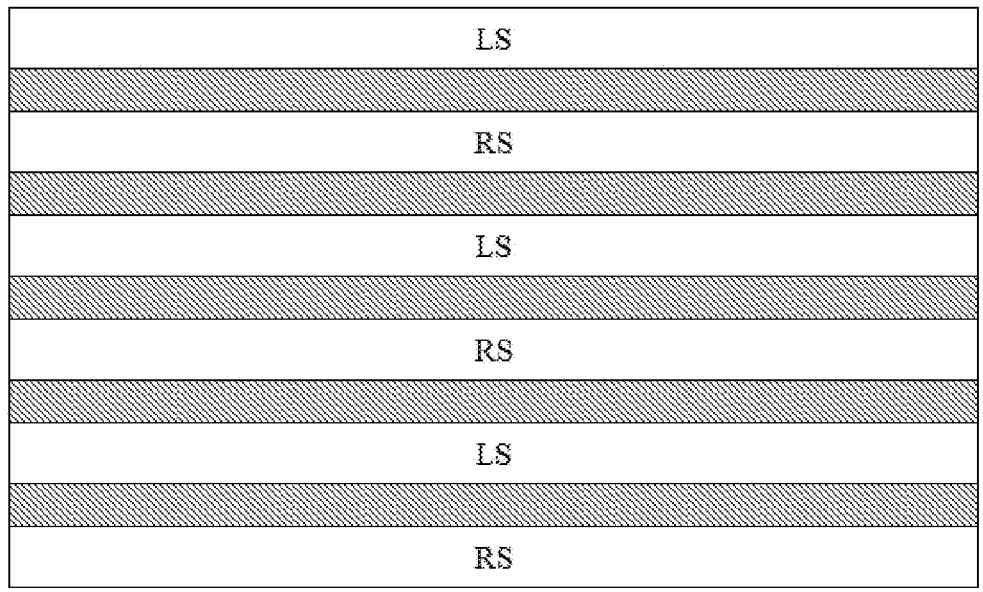
Figure 13:
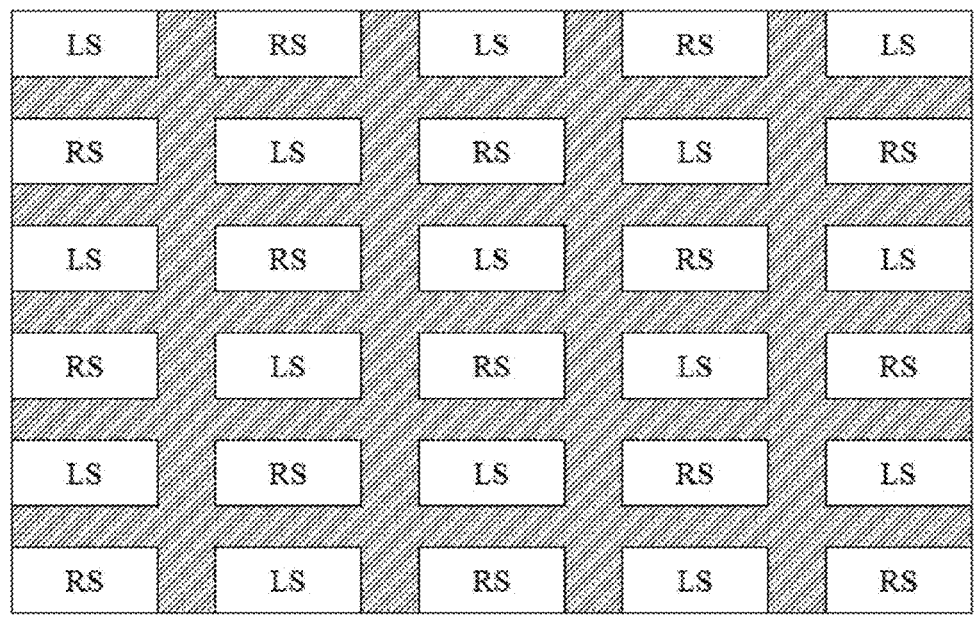
Figure 16:
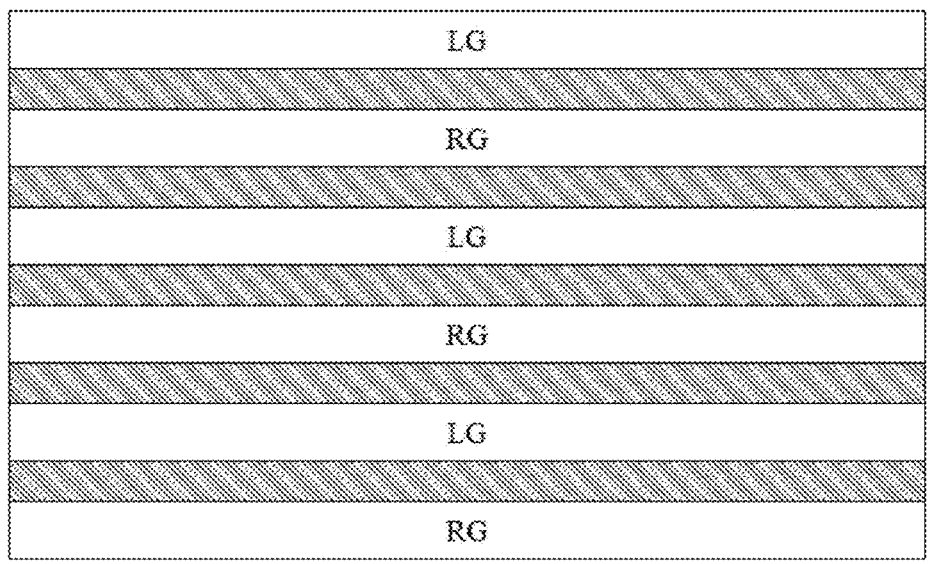
Figure 17:
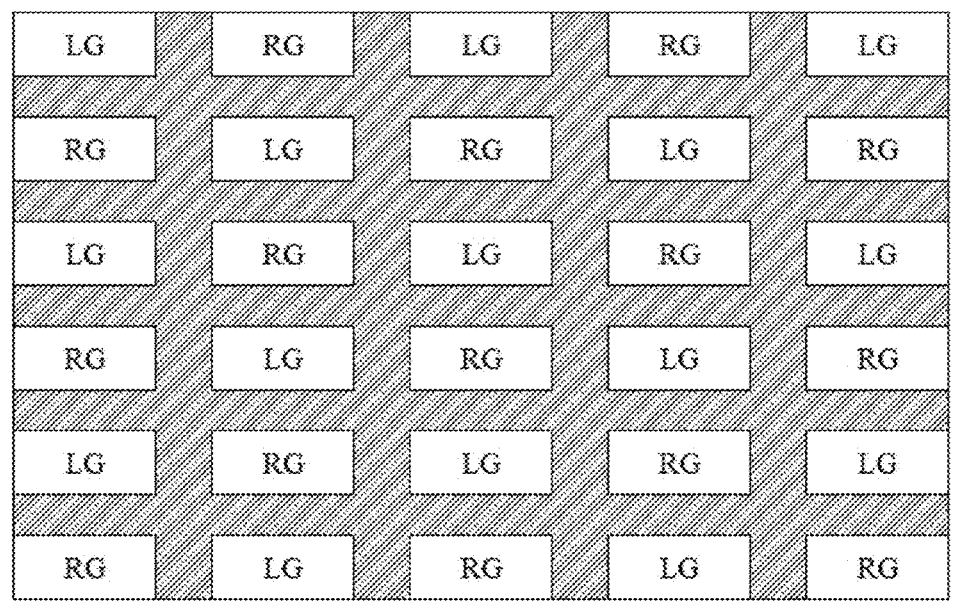
Figure 18:
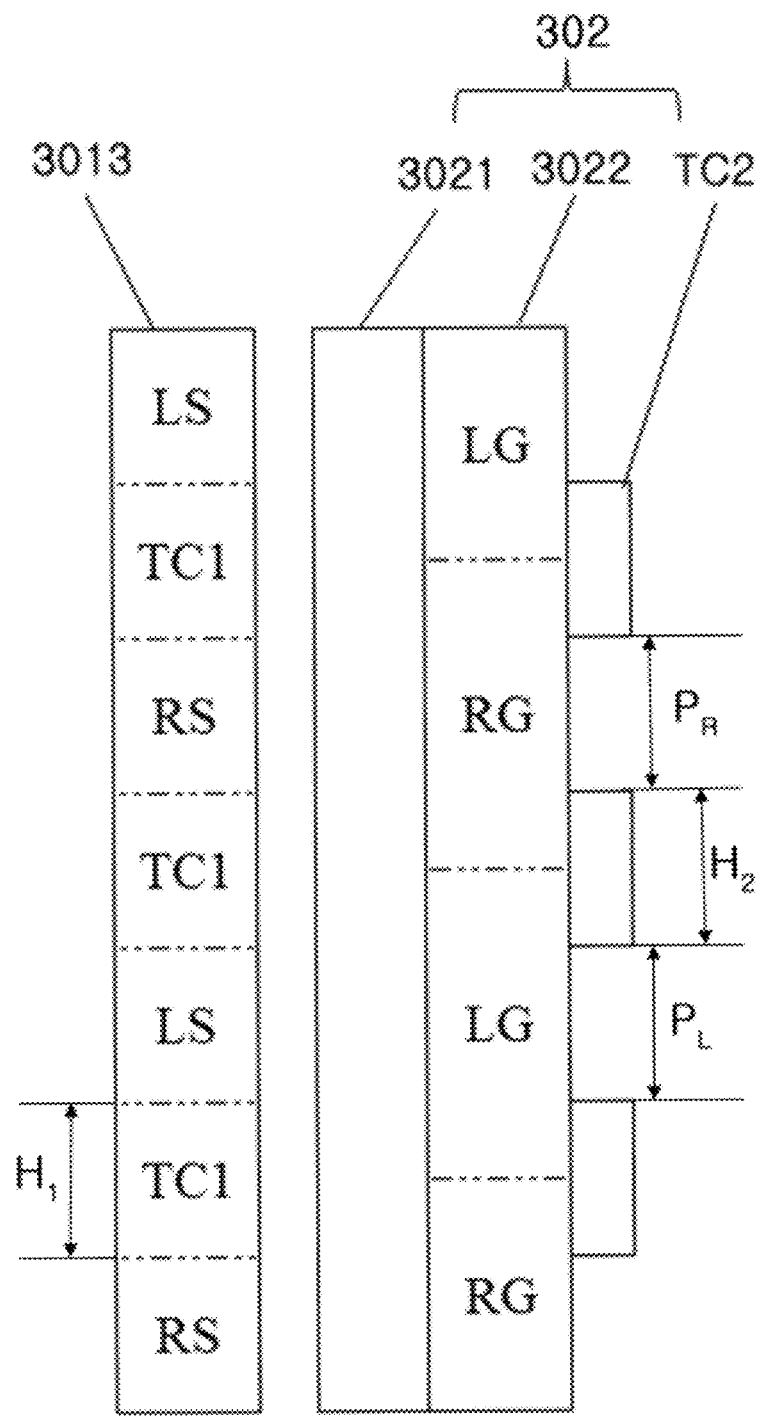
FIG. 18 shows a schematic of an illustrative embodiment of a 3D device.
Figure 19:
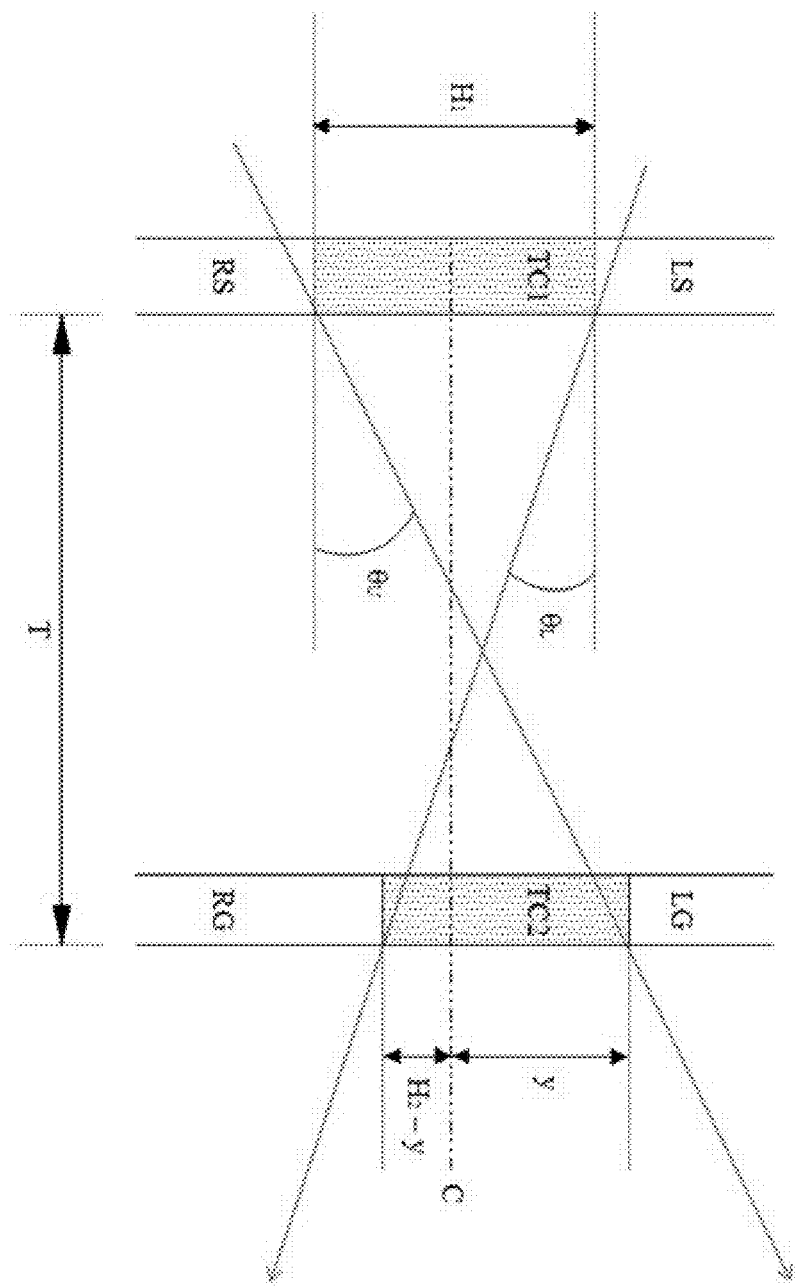
FIG. 19 shows a schematic of an illustrative embodiment of formations of viewing angles in a display device
Figure 20:
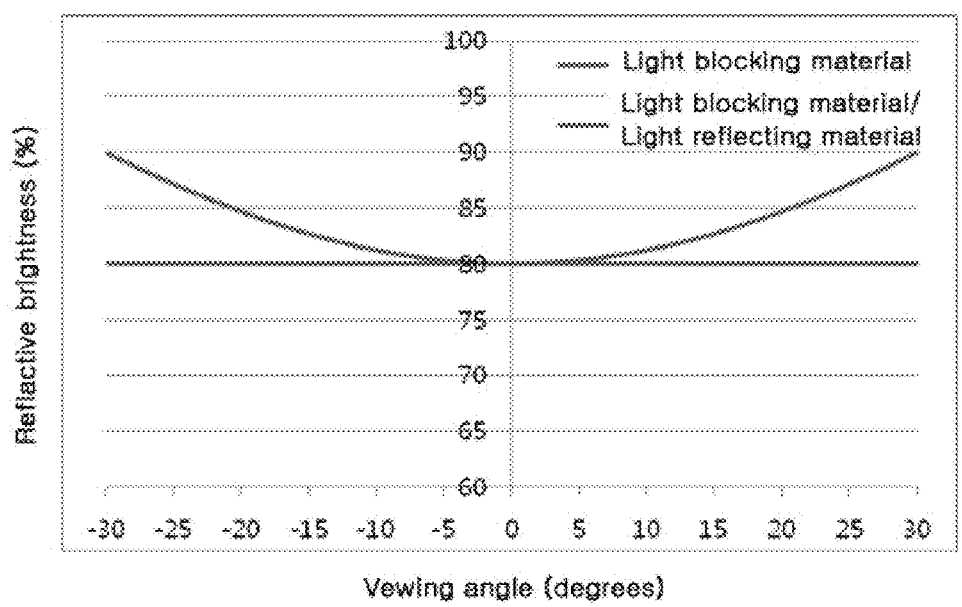
FIG. 20 shows graph showing a result of relative brightness of FPRs of Examples 1 and 2.

In a FPR having a pitch of 540 μm for a 47-inch stereoscopic image display device, a groove having a width of 100 μm was formed on the border between the first region and the second region whose liquid crystal alignment abilities are different from each other and was filled with a light blocking material, thereby manufacturing an FPR of Example 1. FIG. 20 shows a relative brightness depending on a viewing angle with respect to a panel without a BM (Black Matrix) when the FPR of Example 1 is attached to a panel for a stereoscopic image display device. As shown in FIG. 20, when the FPR of Example 1 is used, a relative brightness observed from the front side is 81.5% with respect to a panel without BM. Thus, it can be seen that when an FPR including a groove filled with a light blocking material is used, brightness of a stereoscopic image display device can be improved.

Example 2

In a FPR having a pitch of 540 μm for a 47-inch stereoscopic image display device, a groove having a width of 100 μm was formed on the border between the first region and the second region whose liquid crystal alignment abilities are different from each other and was filled with a light blocking material and a light reflecting material, thereby manufacturing an FPR of Example 2. FIG. 20 shows a relative brightness depending on a viewing angle when the FPR of Example 2 is attached to a panel for a stereoscopic image display device. FIG. 20 shows a relative brightness depending on a viewing angle with respect to a panel without a BM (Black Matrix) when the FPR of Example 2 is attached to a panel for a stereoscopic image display device. As shown in FIG. 20, when the FPR of Example 2 is used, a relative brightness observed from the front side is 81.5% with respect to a panel without BM. Further, as a viewing angle is increased, a relative brightness at a viewing angle of 30° is increased to 90% with respect to the panel without a BM. Thus, it can be seen that when an FPR including a groove filled with a light blocking material and a light reflecting material is used, a stereoscopic image display device shows a light blocking effect and a brightness improving effect simultaneously, and also shows an excellent brightness improving effect depending on a viewing angle.

Comparative Example 1

Figure 21:
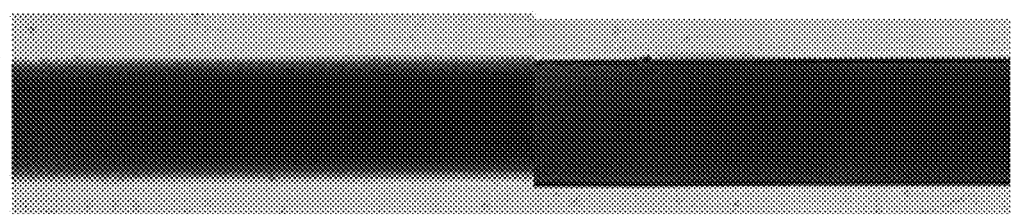
FIG. 21 shows FPRs of Comparative Example 1(a) and Example 1(b).

A light blocking film having a width of 100 which is same as a width of the groove of Example 1 was formed directly on a liquid crystal alignment film without forming a groove in the liquid crystal alignment film, thereby manufacturing an FPR of Comparative Example 1. FIG. 21 shows a result of comparison in light blocking effect of an FPR between Comparative Example 1(a) and Example 1(b). As shown in FIG. 21, Comparative Example 1 comprising the light blocking film formed directly on a liquid crystal alignment film without forming a groove can use 80% of the area of the light blocking film for a light-blocking and Example 1 comprising a groove filled with a light blocking material can use 98% of the area of the groove for a light-blocking. That is, if the light blocking film is formed directly on a liquid crystal alignment film without a groove as shown in Comparative Example 1, a light blocking effect is reduced with respect to a width of the light blocking film due to a difference in height between a region where the light blocking film is formed and a region where the light blocking film is not formed.

DESCRIPTIONS OF THE MARKS IN DRAWING

101: a surface having liquid crystal alignment ability
102: a groove
103: a underlying layer
104: a liquid crystal alignment layer
105: a substrate layer
106: a light blocking material
107: a light reflecting material
201: a first region
202: a second region
3: a 3D device
3011: a light source
3012: a first polarizing plate
3013: an image generation region
301: a displaying part
3021: a second polarizing plate
3022: a polarization controlling part
302: an optical filter
LS: a region for generating a signal for a left eye
RS: a region for generating a signal for a right eye
TC1: a first light-penetration-controlling region
LG: a region for controlling the polarization state of a signal for a left eye
RG: a region for controlling the polarization state of a signal for a right eye
TC2: a second light-penetration-controlling region
$H_1$: the width of a first light-penetration-controlling region
$H_2$: the width of a second light-penetration-controlling region
$P_L$: the width of a region for controlling the polarization state of a signal for a left eye
$P_R$: the width of a region for controlling the polarization state of a signal for a right eye
T: a distance from a displaying part to an optical filter
C: a hypothetical normal of a line bisecting the width of a first light-penetration-controlling region with respect to the surface of the first light-penetration-controlling region or an image-generating region
y: a distance from the point, at which the hypothetical normal line (C) comes in contact with a second light-penetration-controlling region, to the point at which the second light-penetration-controlling region is present
$\theta_U$, $\theta_L$: Viewing angles

What is claimed is:

1. A liquid crystal alignment film, comprising:
a first layer having a surface on which a groove having a width in the range of 100 μm to 300 μm and a depth in the range of 0.5 μm to 5 μm is formed, wherein the groove is filled with a light blocking material, a light reflecting material or a light scattering material; and
a liquid crystal alignment layer formed on a surface of the light blocking material, the light reflecting material or the light scattering material,
wherein the light blocking material, the light reflecting material or the light scattering material is not formed on the whole surface of the first layer.

2. The liquid crystal alignment film of claim 1, wherein a plurality of the grooves are formed on the surface of the first layer, and
wherein the grooves have stripe shapes extending in the same direction respectively, and are separately arranged from each other.

3. The liquid crystal alignment film of claim 2, wherein a pitch between the grooves being separately arranged is in a range of 50 μm to 1000 μm.

4. The liquid crystal alignment film of claim 1, wherein the groove is filled with the light blocking material and the light blocking material is carbon black, graphite, iron oxide, an azo-based pigment, or a phthalocyanine-based pigment.

5. The liquid crystal alignment film of claim 1, wherein the groove is filled with the light reflecting material and the light reflecting material is metallic ink, cholesteric liquid crystal, or a birefractive material.

6. The liquid crystal alignment film of claim 1, wherein the groove is filled with the light scattering material and the light scattering material is silica particles or nanoparticles.

7. The liquid crystal alignment film of claim 1, wherein the surface of the first layer has a maximum height roughness of 1 μm or less.

8. A manufacturing method of a liquid crystal alignment film, comprising:
forming a groove having a width in a range of 5 μm to 300 μm and a depth in a range of 0.5 μm to 5 μm on a surface of a first layer,
filling the groove with a light blocking material, a light reflecting material or a light scattering material, wherein the light blocking material, the light reflecting material or the light scattering material is not formed on the whole surface of the first layer, and
forming a liquid crystal alignment layer on a surface of the light blocking material, the light reflecting material or the light scattering material.

9. An optical filter, comprising:
a liquid crystal alignment film comprising a first layer having a surface on which a groove having a width in the range of 100 μm to 300 μm and a depth in the range of 0.5 μm to 5 μm is formed, wherein the groove is filled with a light blocking material, a light reflecting material or a light scattering material;
a liquid crystal alignment layer formed on a surface of the light blocking material, the light reflecting material or the light scattering material; and
a liquid crystal layer that is formed on the liquid crystal alignment layer and that includes a first region and a second region which are different from each other in the phase retardation property,
and
wherein the light blocking material, the light reflecting material or the light scattering material is not formed on the whole surface of the first layer.

10. The optical filter of claim 9, wherein two or more grooves are formed on the surface of the first layer, and the two or more grooves have stripe shapes extending in the same direction respectively, and are separately arranged from each other.

11. The optical filter of claim 10, wherein the first region and the second region have stripe shapes extending in the same direction respectively, and are alternately arranged adjacent to each other, and
the grooves are overlapped with the first region or the second region on the border between the first region and the second region when observed from a direction of a normal line of the surface of the liquid crystal alignment film.

12. The optical filter of claim 9, further comprising a polarizing layer formed on the liquid crystal layer.

13. A display device comprising the optical filter of claim 9.

14. The display device of claim 13, further comprising:
a displaying part comprising a region for generating a signal for a right eye, configured to generate the signal for the right eye; a region for generating a signal for a left eye, configured to generate the signal for the left eye; and a light-penetration-controlling region that is adjacent to the regions for generating the signals for the right eye and the left eye,
wherein the optical filter is arranged on one side of the displaying part such that one of first and second regions is in a position into which a signal for the right eye can enter, the other one of the first and second regions in a position into which a signal for the left eye can enter, and wherein the maximum value of the angle $\theta_U$ satisfying the following Formula 2 and the maximum value of the angle $\theta_L$ satisfying the following Formula 3 are not less than three degrees:

$$\tan \theta_U = (H_1 2y)/2T \quad \text{[Formula 2]}$$

$$\tan \theta_L = (H_1 + 2H_2 - 2y)/2T \quad \text{[Formula 3]}$$

wherein $H_1$ is a width of the light-penetration-controlling region, $H_2$ is a width of groove formed in the optical filter, T represents a distance from the displaying part to the optical filter, and y represents a distance from the point, at which a hypothetical normal of a line bisecting the width of the penetration-controlling region with respect to the surface of the light-penetration-controlling region comes in contact with the groove of the optical filter, to the point on which the groove is present.

* * * * *